March 13, 1956 — A. M. HAMILTON — 2,738,039
MASTS, TOWERS OR LIKE STRUCTURE
Filed April 17, 1951 — 2 Sheets-Sheet 1
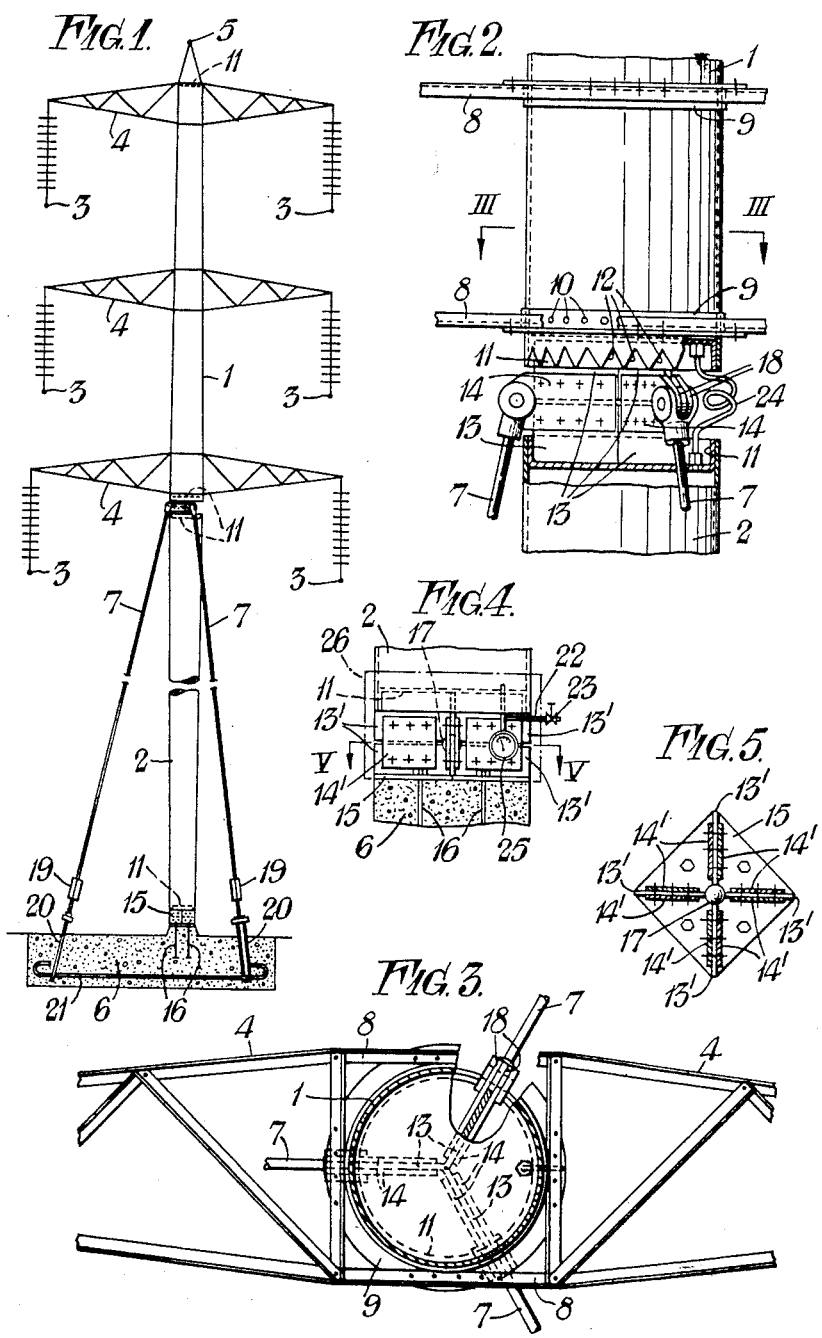
Inventor
Archibald Milne Hamilton
by Sommers & Young
Attorneys March 13, 1956  A. M. HAMILTON  2,738,039
MASTS, TOWERS OR LIKE STRUCTURE
Filed April 17, 1951  2 Sheets-Sheet 2
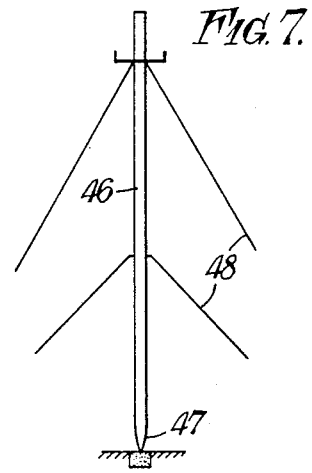
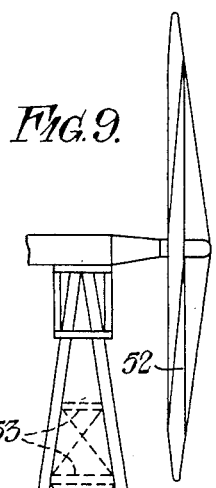
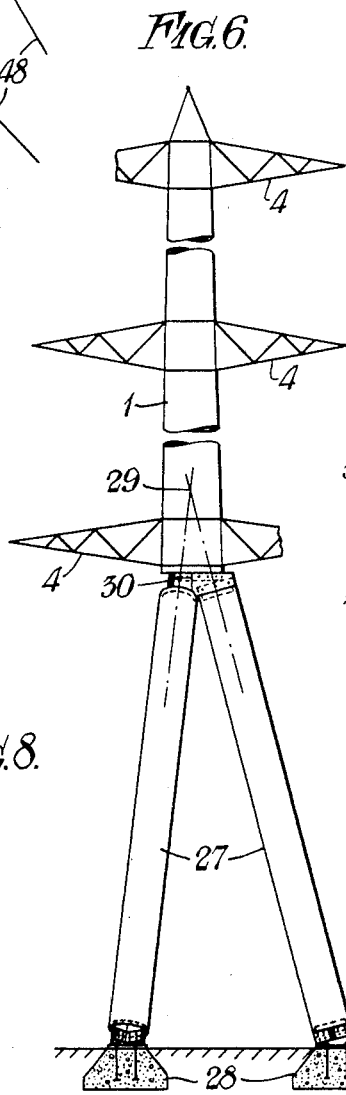
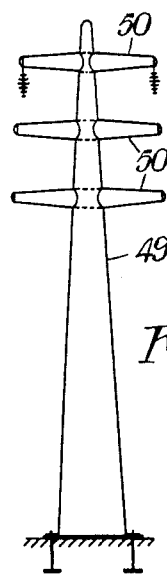
Inventor:
Archibald Milne Hamilton
by Sommers & Young
Attorneys United States Patent Office 2,738,039
Patented Mar. 13, 1956

2,738,039

MASTS, TOWERS, OR LIKE STRUCTURE

Archibald Milne Hamilton, Westminster, London, England

Application April 17, 1951, Serial No. 221,355

1 Claim. (Cl. 189—26)

This invention concerns improvements relating to masts, towers and like structures, that is comparatively lofty structures, standing upright on the ground, which have to resist torsional forces as well as compression, bending and shear forces produced by supported loads and by wind or other loading. Such conditions arise in poles or towers for supporting power-transmission lines and the invention particularly aims at providing improved structures for this purpose.

An object of the invention is to enable additional strength to be attained and/or weight to be saved in such structures, whereby they can safely be made larger or their loading increased or whereby economy in metal and expense can be achieved in structures of the same size and loading. A further object is to provide structures which can be made simpler and easier to erect, particularly by reducing or eliminating rigid bracing and similar auxiliary members.

An upright free-standing structure in accordance with the invention comprises one or more closed thin-walled shells, generally of circular cross section and cylindrical or slightly conical form, made of metal or other inherently rigid material and provided with a gaseous filling exerting upon the shell an internal pressure which tends to place the shell under circumferential and longitudinal tension and thus to resist change of shape of its wall, so preventing buckling, rippling and like forms of wall collapse under the applied loading and increasing the effective resistance of the shell to the compression, bending, shear and/or torsion forces normally withstood by the rigid material of the structure.

The structure may consist of a single pressurized shell or may be built up from a number of such shells. A shell may be divided into a number of pressurized sections.

The invention can be of benefit in enhancing resistance to all kinds of forces, except simple tension, and is especially advantageous where combinations of forces occur. The shell shape is in any case strong in bending in all directions and in torsion and has a good section modulus for compression. With pressurization of the shell, however, maximum advantage can be taken of its shape, since the shell wall can be made thin and of large diameter without being liable to collapse or become unstable under the principal load or under local loading. The forces can be well distributed and high local stresses avoided. Finally, the damping effect of the internal pressure tends to prevent dangerous vibrations from being set up in the shell.

This application is a continuation-in-part of application Serial No. 115,465 filed September 13, 1949, and now abandoned.

Several embodiments of the invention by way of example will now be described with reference to the accompanying drawings, in which:

Fig. 1 is a side elevation of a tower for electrical power-transmission wires,

Fig. 2 an elevation of the middle portion of the tower to a larger scale, certain parts being shown broken away, Fig. 3 a section on the line III—III in Fig. 2, Fig. 4 an elevation of the lowest portion of the tower, Fig. 5 a section on the line V—V in Fig. 4, Fig. 6 a side elevation of another form of tower, Figs. 7 and 8 side elevations of simpler forms of masts, and Fig. 9 a side elevation of a tower structure.

The tower illustrated in Figs. 1-5 comprises a pressurized metal shell which is of generally cylindrical form, but tapers slightly from the middle towards the ends. As illustrated, the shell is divided at about mid-height into upper and lower sections 1, 2, but it may be convenient, depending upon the height, for the shell to comprise only one section or more than two sections. The several transmission wires 3 are suspended from cross-arms 4 of lattice work and a ground wire 5 is carried at the top of the tower. The tower is supported upon a reinforced concrete base 6 with the assistance of wire guy ropes 7.

Figs. 2 and 3 illustrate one manner in which the lattice arms 4 can be connected to the shell-section 1: Upper and lower frame members 8 of the arms are secured, for example by bolting, between the flanges of angle-section rings 9 attached to the shell. Each ring 9 is provided at close intervals with holes 10 through which solder is applied to the shell surface. By this means, even where the shell is made of high-tensile or work-hardened metal, an effective attachment can be produced without the danger of reducing the strength of the metal which is involved in heating it to its annealing or softening temperature. However, if this is not a material consideration, the rings 9 may be brazed or welded to the shell 1. Alternatively, they may be clamped on the shell.

Figs. 2 and 3 also illustrate how the two shell sections 1, 2 may be connected: The adjacent ends of the sections are closed, as are also the remote ends, by inwardly dished end-pieces 11 which are secured inside the said ends, for example by welding. If there is a danger of reducing the strength of the metal during welding, it may be advantageous to increase the total length of the welded connection, for example by forming the end of the shell section with V notches 12, slits or the like, so that a zig-zag or like weld can be made. Alternatively other forms of connections, such as bolted or riveted joints, may be employed and rendered gas tight by additional sealing means in known manner. The end pieces 11 are formed or provided, as by welding, with radial webs 13 (as shown, three in number) which project from respective end pieces and are secured together by splicing plates 14 bolted or riveted thereto. In such a connection, the webs 13 effectively withstand and transmit all the forces encountered at the connection, including internal and external pressure and bending and twisting forces.

As illustrated in Figs. 4 and 5, a somewhat similar arrangement may be employed for mounting the shell-section 2: As illustrated, the end piece 11 is provided with a cruciform arrangement of webs 13' connected by splicing plates 14' to similar webs on a base plate 15 anchored to the concrete foundation 6 by bolts 16. The connection may be made rigid by bolting the plates 14' tightly to the webs. Alternatively and as illustrated, the weight of the tower may be supported through a centrally disposed steel ball 17 and the spliced connection made to allow for slight deflection from the vertical.

As shown, the guy ropes 7 are connected to eyes 18 formed on the splicing plates 14 (Fig. 2). If the ropes had to be attached to a plain shell-portion of a tower, however, a ring with eyes for the purpose could be secured on the shell like one of the rings 9. The guy ropes 7 are connected by turnbuckles 19 to anchorages 20 (Fig. 1) secured in the foundation 6, for instance by being engaged with reinforcement bars 21 thereof. The foundation itself may consist simply of three arms extending radially outwardly from under the tower. With four guy ropes 7, a cruciform foundation and connection 13, 14 will be provided.

The internal pressure, normally of air or an inert gas such as nitrogen, is applied through a pipe 22 provided with a union and cock at 23 (Fig. 4). A pipe 24 (Fig. 2) serves for the transmission of the pressure to the shell section 1. A pressure gauge 25 may be connected to the pipe 22 or a remotely indicating or remotely visible pressure gauge or tell-tale may be provided. The pressure may be maintained automatically by a compressor which is started and stopped in dependence on the pressure condition or, through a reducing valve, from a high-pressure gas vessel. Alternatively, the pressure may be made up periodically or as required by a travelling pressurizing unit. The whole base portion of the tower is preferably enclosed by a locked cover indicated at 26 (Fig. 4).

Purely by way of example, for such a tower 100 feet high, the diameter of the shell, if made of sheet-steel, might be 4 feet at the middle and 3 feet at the top and bottom. The thickness of the shell would be between $1/16''$ and $1/8''$ depending upon the steel employed and the loading on the tower. An internal pressure of 80 to 100 lbs. per sq. inch would then be appropriate. At the very least, however, the pressure should be about 100 lbs. per sq. foot, i. e. more than equivalent to the pressure or suction of very severe gale-force wind.

As far as is practicable, the shell should be seamless or have longitudinal seams only, the seams being as strong as the sheet. The seams are preferably butt-welded, excess metal being ground away to equalise the stress distribution.

Fig. 6 illustrates a tower of somewhat stronger construction. A single pressurized shell section 1 is mounted upon three pressurized tripod legs 27 having spaced individual foundations 28. With such tripod support, the tower has a high resistance to overturning and the arms 4 can be set at any angle on the upper section 1 so as best to take the strain of wires extending in required directions from the tower. The axes of the tripod legs intersect at a point 29 well above the actual connection by spliced webs at 30. This assists in reducing the bending moment which will arise in the section 1 in the event of an abnormal pull on the top arm 4.

Generally in a structure comprising several shell sections or shells, these will all be connected together or to a common manifold. Particularly in a complex structure, however, separate shells or groups of shells may be subject to independent pressures, especially if shells with materially different dimensions make different pressures desirable.

For light duties, simple pressurized tubular masts, poles or posts may be used with or without guys, stays or the like. Fig. 7 shows a tubular mast composed of a single thin-walled cylindrical metal shell 46 which is pressurized by a gas filling. The closed ends are shaped and fitted to suit whatever function they have to perform, for instance are of tapered conical form, as shown for the lower end 47. This lower end 47 is mounted on a foundation and the mast is supported with the assistance of two sets of guy ropes 48. However, a mast or the like may have its full section right down to the ground and be rigidly mounted there, guys being dispensed with or differently arranged to suit requirements. Fig. 8 illustrates a mast or pylon comprising a pressurized shell 49 of conical shape rigidly mounted upon a foundation. In this example, the arms 50 for carrying the transmission wires also comprise pressurized shell elements.

More complex tower structures can be built up in the form of frameworks comprising pressurized shells with or without other non-pressurized structural elements. Fig. 9 illustrates a tower or shear-legs structure consisting of three pressurized cylindrical shells 51 which meet at their tops, whilst their feet form a wide base. The bracing shown by way of example in chain lines comprises pressurized shell elements 53 in compression and normal tensional bracing 54. If desired, the principal shells 51 may be enclosed in fairings of low aerodynamical resistance which are rotatable about the shells so as to offer minimum resistance to wind. As illustrated, the elements 51 serve to support a large windmill 52 driving a generator.

In all such structures, the thickness and/or the cross section of the shell may be increased locally to cater for forces or bending moments arising at particular points. Thus tapered end sections such as 47 (Fig. 7) may suitably be made of thicker metal. As far as possible, however, the thickness will be made uniform throughout in order to simplify construction and the supply of material. If necessary, the shell may be provided with transverse diaphragms affording additional local strength and/or subdividing the interior of the shell.

In the design of masts, towers and like structures in accordance with the invention, known design formulae and criteria for elastic failure may be applied, but the extent to which individual materials conform closely to particular formulae and criteria should be experimentally verified. The following observations may be of general assistance:

The strength of unpressurized thin shells falls off in more or less inverse proportion as the ratio $d/t$ (diameter/wall thickness) is increased beyond certain critical values (about 100 for steel in torsion, about 300 for compression or bending and an intermediate value for shear). By pressurizing the shells, however, shell strengths corresponding to the theoretical design stresses which can be used for thick-walled tubes can be obtained even above these critical values. The optimum internal pressure will depend upon the circumstances, including the nature of the main loading. Generally, however, the pressure may suitably be such as to produce a circumferential stress of about $1/2$ to $2/3$ of the elastic limit, this rule giving a pressure which varies inversely with the $d/t$ ratio. A thin shell will then substantially maintain its shape as long as the maximum shear stress intensity due to external loading does not exceed the minimum tension intensity due to the pressure. Pressurizing of shells may be advantageous down to values of $d/t$ of about 50, or even lower for materials with a low modulus of elasticity, and up to indefinitely high values of $d/t$, at least in theory. In practice, particularly for steel structures subject to wind, $d/t$ may be limited to about 30,000–40,000. Using very high values of $d/t$ and a light gas such as helium or hydrogen, structures may be made very light indeed or even weightless, so that exceptional heights or sizes become possible.

In practice, very accurate maintenance of the internal pressure will not normally be of critical importance. To reduce the dangers arising from loss of pressure, however, the $d/t$ value may be selected so that the structure retains a proportion of its strength even without any internal pressure. Thus an unwrinkled cylindrical steel shell in which $d/t=500$ may retain about one half of its strength if the pressure is lost. With an original factor of safety of about $2\frac{1}{2}$, therefore, the structure should not immediately fail under normal conditions, although its reduced strength may not be sufficient for extreme conditions of high wind or other loading.

As, in a strut of pressurized-shell form, the diameter can readily be made large, it is not difficult to keep low the important ratio $l/k$ (length divided by least radius of gyration). Optimum $l/k$ ratios of 60 to 90 (the lower values for high-tensile steels) can be designed too.

The pressurizing of thin shells enables advantage to be taken, in such shells used in non-tensional roles, of the greater ultimate strength of high tensile metals. Advantage can also be taken of the possibility of raising the elastic limit of work-hardenable metals. Work-hardening may be produced by cold rolling, stretching and so forth or by temporarily stressing the shell beyond the elastic limit by an internal pressure higher than the normal working pressure. Materials other than steels may be employed, especially the strong, heat-treated, light alloys. In all cases, however, it is important to ensure that the danger of corrosion of the shell from either inside or outside is avoided. Thus, the outer surface of such light-alloy shells may sometimes with advantage be made of pure aluminium.

The internal gas pressure (to be understood to include the pressure of a vapour) may be produced otherwise than by a mechanical compressor, for instance by chemical action induced by heat or by vaporisation from a quantity of liquid in, or in communication with, the shell.

Provision may be made for minimising leakage by the automatic sealing of small holes. Thus, known air-drying or tacky substances may be sprayed inside the shell.

I claim:

An upright free-standing structure of the tower type, comprising at least two long closed shells, each shell being made of inherently rigid material and of circular cross section with a thin wall and provided with a gaseous filling exerting on the shell an internal pressure which resists collapse of the thin wall, the said shells being disposed one above another with ends adjoining, dished closure members which are secured in respective adjoining ends of the shells and are furnished with internal radial webs extending outside the ends of the shells, and splicing plates connecting together the webs of such adjoining ends of the shells.

References Cited in the file of this patent

UNITED STATES PATENTS

| | | |
|---|---|---|
| 511,472 | Sumovski | Dec. 26, 1893 |
| 1,462,092 | Roach-Cuming | July 17, 1923 |
| 1,691,818 | Kraft | Nov. 13, 1928 |
| 1,702,165 | Lane | Feb. 12, 1929 |
| 1,761,037 | Gross | June 3, 1930 |
| 2,516,020 | Reed | July 18, 1950 |

FOREIGN PATENTS

| | | |
|---|---|---|
| 454,200 | France | Apr. 23, 1913 |
| 574,541 | France | Apr. 2, 1924 |